(12) United States Patent
Cummings

(10) Patent No.: US 12,241,446 B2
(45) Date of Patent: Mar. 4, 2025

(54) REACTIVE, REVERSIBLE BLADE TURBINE FOR POWER GENERATION AND PUMPING WATER

(71) Applicant: Michael Scot Cummings, Walterboro, SC (US)

(72) Inventor: Michael Scot Cummings, Walterboro, SC (US)

(*) Notice: Subject to any disclaimer, the term of this patent is extended or adjusted under 35 U.S.C. 154(b) by 0 days.

(21) Appl. No.: 18/439,665

(22) Filed: Feb. 12, 2024

(65) Prior Publication Data

US 2024/0183330 A1 Jun. 6, 2024

Related U.S. Application Data

(62) Division of application No. 17/774,436, filed as application No. PCT/US2020/058516 on Nov. 2, 2020, now Pat. No. 12,025,090.

(60) Provisional application No. 63/023,345, filed on May 12, 2020, provisional application No. 62/943,455, filed on Dec. 4, 2019.

(51) Int. Cl.
  *F03B 3/14* (2006.01)
  *F03B 3/10* (2006.01)

(52) U.S. Cl.
  CPC ............ *F03B 3/145* (2013.01); *F03B 3/10* (2013.01); *F05B 2220/705* (2020.08); *F05B 2240/93* (2013.01); *F05B 2260/31* (2020.08); *F05B 2260/422* (2020.08); *F05B 2260/72* (2013.01)

(58) Field of Classification Search
  CPC .. F03B 3/12; F03B 3/121; F03B 3/123; F03B 3/13; F03B 3/145; F03B 13/10; F03B 13/12; F03B 13/264; F03B 15/06; F03B 17/06; F03B 17/062; F03B 17/065; F03B 17/061
  See application file for complete search history.

(56) References Cited

U.S. PATENT DOCUMENTS

| 4,095,422 A | * | 6/1978 | Kurakake | ............ F03B 17/065 416/85 |
| 4,346,305 A | | 8/1982 | White | |
| 4,383,797 A | | 5/1983 | Lee | |
| 8,763,386 B2 | | 7/2014 | Greene | |

(Continued)

FOREIGN PATENT DOCUMENTS

| AU | 2016364028 A1 | * | 7/2018 | ............ B63B 35/28 |
| CN | 105691555 A | * | 6/2016 | |

(Continued)

OTHER PUBLICATIONS

Machine Translation of the Abstract of WO 2011122895A2; published Oct. 6, 2011; 1 page.

(Continued)

*Primary Examiner* — Courtney D Heinle
*Assistant Examiner* — Ryan C Clark
(74) *Attorney, Agent, or Firm* — Thrive IP

(57) ABSTRACT

A reactive blade turbine system works vertically, horizontally, or at an angle and clockwise or counterclockwise according to blade angle and locking position and adjusts to variations in fluid flow such as changes in tidal currents to generate power more efficiently regardless of direction of fluid flow. A method for generating electrical power from a continuous fluid flow via the reactive turbine system is also provided herein.

7 Claims, 11 Drawing Sheets

(56) References Cited

U.S. PATENT DOCUMENTS

| | | | |
|---|---|---|---|
| 10,371,120 B2 | 8/2019 | McCormack | |
| 10,774,806 B1 | 9/2020 | Lu | |
| 10,876,515 B2 | 12/2020 | McCormack | |
| 12,006,918 B2 | 6/2024 | Cummings | |
| 12,025,090 B2 | 7/2024 | Cummings | |
| 2004/0103670 A1 | 6/2004 | Ryan | |
| 2005/0001432 A1 | 1/2005 | Susman et al. | |
| 2005/0134050 A1 | 6/2005 | Salls, Jr. | |
| 2005/0285407 A1 | 12/2005 | Davis et al. | |
| 2006/0054074 A1 | 3/2006 | Wingett et al. | |
| 2008/0014089 A1 | 1/2008 | Janssen | |
| 2010/0237626 A1 | 9/2010 | Hamner | |
| 2010/0244450 A1 | 9/2010 | Tabe | |
| 2010/0258449 A1* | 10/2010 | Fielder | F03B 17/061 204/278 |
| 2011/0089695 A1 | 4/2011 | Krouse et al. | |
| 2012/0019004 A1 | 1/2012 | Ekern | |
| 2012/0183400 A1 | 7/2012 | Onodera | |
| 2012/0200156 A1* | 8/2012 | Weller | F03B 13/26 290/53 |
| 2012/0211987 A1 | 8/2012 | Roe et al. | |
| 2013/0334823 A1 | 12/2013 | Hopper | |
| 2014/0219800 A1 | 8/2014 | Lee | |
| 2014/0333071 A1 | 11/2014 | Wang | |
| 2015/0091303 A1 | 4/2015 | Lee | |
| 2016/0237979 A1 | 8/2016 | Clements | |
| 2017/0138333 A1 | 5/2017 | Toran | |
| 2017/0159645 A1 | 6/2017 | Qin | |
| 2017/0226985 A1* | 8/2017 | Santos | F03B 17/067 |
| 2018/0030958 A1* | 2/2018 | Sant | F03D 9/28 |
| 2018/0087484 A1* | 3/2018 | Schurtenberger | F03B 3/121 |
| 2018/0238294 A1 | 8/2018 | Alm | |
| 2018/0245564 A1* | 8/2018 | Sheldon-Coulson | H02K 7/075 |
| 2018/0258906 A1 | 9/2018 | Mcclary | |
| 2019/0048846 A1 | 2/2019 | Hochstein et al. | |
| 2019/0128241 A1 | 5/2019 | Achard | |
| 2019/0285053 A1 | 9/2019 | Lu | |
| 2020/0010155 A1* | 1/2020 | Robinson | F03D 9/008 |
| 2020/0300218 A1 | 9/2020 | Curutchet | |
| 2024/0247640 A1 | 7/2024 | Cummings | |

FOREIGN PATENT DOCUMENTS

| | | | |
|---|---|---|---|
| CN | 107044378 A | 8/2017 | |
| CN | 110435827 A * | 11/2019 | |
| CN | 111637013 A * | 9/2020 | |
| CN | 112366766 A * | 2/2021 | F03B 13/20 |
| DE | 102014111836 B4 | 6/2016 | |
| DE | 202019001821 U1 | 5/2019 | |
| DE | 202019001000 U1 | 6/2019 | |
| DE | 102018100230 A1 | 7/2019 | |
| DE | 202019001820 U1 | 8/2019 | |
| DE | 202019003419 U1 | 9/2019 | |
| DE | 202019004691 U1 | 11/2019 | |
| DE | 202019004516 U1 | 12/2019 | |
| DE | 202019003156 U1 | 2/2020 | |
| EP | 0265594 A | 5/1988 | |
| FR | 2955363 A3 | 7/2022 | |
| GB | 2184171 A1 | 6/1987 | |
| GB | 2416193 A * | 1/2006 | F03B 17/06 |
| GB | 2435908 A1 | 9/2007 | |
| GB | 2617203 A | 4/2023 | |
| JP | 2016039130 A * | 3/2016 | C01B 3/042 |
| KR | 20160150431 A * | 12/2016 | F03B 13/264 |
| KR | 20200006875 A * | 1/2020 | F03B 13/264 |
| WO | 2009131459 A2 | 10/2009 | |
| WO | 2011122895 A2 | 10/2011 | |
| WO | WO-2013107724 A2 * | 7/2013 | F03B 13/264 |
| WO | 2020219010 A1 | 10/2020 | |
| WO | 2021/112993 A | 6/2021 | |
| WO | 2021112993 A1 | 6/2021 | |
| WO | 2023068925 A1 | 4/2023 | |

OTHER PUBLICATIONS

European Search Report issued in related EU Application No. 20897599.5; report issued Apr. 19, 2024; 32 pages.

An identification of an earlier application pursuant to 37 CFR 1.98 (d) (1) is attached listing: U.S. Pat. No. 12,025,090 and PCT/US20/58516 (Published as WO 2021/112993; Published: Jun. 10, 2021); 1 page.

F. Chen, "Appendix A: Catalog of Global Underwater Turbines" The Kuroshio Power Plant, Lecture Notes in Energy 15, DOI 10.1007/978-3-319-00822-6; @ Springer International; Publishing Switzerland 2013; 47 pages.

International Search Report and Written Opinion of related application No. PCT/US19/28509; mailed Jul. 24, 2019; 9 pages.

International Search Report and Written Opinion of related application No. PCT/US20/58516; mailed Feb. 26, 2021; 15 pages.

Patents Act 1977: Search Report under Section 17 related to Application No. GB0604625.4, Patent No. GB 2435908; date of search Jan. 22, 2007; 1 page.

Screen Shot of GKinetic website "Our Story"; @ 2021 GKinetic; https://gkinetic.com/our-story/; 2 pages.

Examination Report of related Indian Application No. 202117047500; issued Mar. 31, 2022; 6 pages.

Supplementary Partial European Search Report; Issued in related European Application No. 20897599.5; Issue Date: Dec. 1, 2023; 13 pages.

Machine translation of FR 2955363; Published Jul. 22, 2022; 1 page.

Office Action issued in parent U.S. Appl. No. 17/774,436; notification date May 31, 2023; 7 pages.

Office Action issued in parent U.S. Appl. No. 17/774,436; notification date Oct. 4, 2023; 13 pages.

Partial Search Result and Provisional Opinion on Patentability of related European Application No. 19925588.6; issued Mar. 31, 2022; 11 pages.

Machine Translation of "Wave energy pumped storage power generation system"; Application No. CN 107044378; published Aug. 15, 2017; 4 pages.

Extended European Search Report of related European Application No. 19925588.6; Issued Feb. 21, 2023; 11 pages.

Machine Translation of the abstract of CN 107044378; Published Aug. 15, 2017; Application is referenced in the Extended European Search Report ; 1 page.

Office Action issued in parent U.S. Appl. No. 17/602,912; Notification date: Sep. 11, 2023; 6 pages.

Office Action issued in parent U.S. Appl. No. 17/602,912; Notification date: Nov. 21, 2023; 15 pages.

* cited by examiner

REACTIVE, REVERSIBLE BLADE TURBINE FOR POWER GENERATION AND PUMPING WATER

CROSS-REFERENCE TO RELATED APPLICATIONS

This utility patent application is a divisional of and claims priority to U.S. Utility patent application Ser. No. 17/774,436 filed in the United States Patent and Trademark Office ("USPTO") on May 4, 2022, which is a national stage application of and claims priority to Patent Cooperation Treaty Application Number PCT/US20/58516 filed in the USPTO on Nov. 2, 2020, which claims benefit of U.S. Provisional Patent Application Ser. No. 63/023,345, filed in the USPTO on May 12, 2020, and benefit of U.S. Provisional Patent Application Ser. No. 62/943,455, filed in the USPTO on Dec. 4, 2019, all of which are incorporated herein by reference thereto in their entireties.

BACKGROUND OF THE DISCLOSURE

Alternative energy generation is sought for reasons ranging from political to ideological to hoped-for cost reductions. However, known alternative energy sources such as solar and wind, standing alone, have substantial drawbacks.

On a cost per watt basis, generating electricity based on solar energy is expensive compared to conventional hydrocarbon fuels, wind, hydro, coal, and nuclear power. A single solar cell using the most advanced semiconductor material to date generates relatively little electricity. Therefore, solar panels with extremely large surface areas are required to capture sufficient sunlight to generate satisfactory electricity. Still further, expensive battery storage banks are needed to offset inevitable cloudy days when the solar panels are dormant.

Windmills are another popular source of alternative energy, but like solar this method of electricity generation requires expensive capital investment and is subject to the weather—if no wind is blowing, no energy is being generated. Also, like solar, harnessing wind for electricity generation requires large windmill farms to be practical relative to the expensive capital equipment and installation costs. Even a few adamant supporters will have to admit that finding the large areas needed to harness these energy sources is fraught with controversy; for instance, acres of land are required for numerous and massive windmills.

Another source of alternative energy is to harness wave and current action. However, there are shortcomings with fixed blade turbines used in water. For instance, as flowing water forces a blade to turn, a counterproductive drag is generated along the trailing side of the turning blade, which creates a "lock-up" effect. This effect causes the turbine to lose torque from the rotating force of the water, which is needed to generate electrical power.

What is needed in the field of alternative energy production are turbines that maximize power generation throughout a full, smooth rotation of the turbine and without regard to water flow direction, current speeds, and passing debris.

BRIEF SUMMARY OF THE DISCLOSURE

The present disclosure is directed in general to a reactive blade turbine system using turbine blades that can work vertically or horizontally or on at an angle, for instance, approximately 45 degrees, on an anchored buoy system or deployed from a crane or floating and anchored from a ship. A turbine according to the present disclosure also can work clockwise or counterclockwise according to blade angle and locking position. It can change direction with changes in tidal currents and work by itself without any choking or funneling effect. Turbine designs according to the present disclosure can capture the power of water currents in any direction at any angle and are virtually 100% efficient relative to their square foot area and angles of their blades at any given moment as the turbines rotate on individual axes from the force of moving water currents.

An exemplary reactive blade turbine system according to the disclosure may include a power generator having submersible turbine blades in communication with a flow of fluid in a body of water; a water tower having a water pipe disposed proximate the generator; a submersible pump in communication with the turbine blades, the submersible pump in communication with the water pipe to fill the water tower as the turbine blades are rotated by the flow of fluid, the turbine blades further causing the power generator to generate a first source of electricity; a hydro turbine generator connected to the water pipe; and a pumping assembly having a water conduit in communication with the water tower, the pumping assembly being activated by wave action to deliver water to the water tower; and a rechargeable battery in communication with the power generator and the hydro turbine generator; wherein, when the water tower reaches a desired level, the water is released to activate the hydro turbine generator to generate a second source of electricity, the first and second sources of electricity being storable in a rechargeable battery or in communication with an electrical grid.

According to this aspect of the disclosure, the flow of fluid is water current, and the turbine blades are configured to rotate as the water current passes along the blades. Moreover, the pumping assembly may include a float and a conduit in which the float is movably disposed about the conduit to pump water through the conduit into the water tower. The pumping assembly may further include a piston assembly that pumps water into the water tower as the float moves or by wave action. Multiple floats and piston pumps may be provided to pump water into the water tower.

In another embodiment of the disclosure, a reactive turbine system may include a turbine having a plurality of blades being configured for communication with a flow of fluid, the turbine further comprising a top base and a bottom base, a system axis, and respective individual axes for each blade, wherein the top and bottom bases rotate counterclockwise on the system axis causing the reactive turbine blade to rotate until the blade contacts a flow of water on an opposing side of the system. In this embodiment, the flow of fluid may be water current, and the turbine blades may be configured to rotate as the water current passes along the blades. The fluid flow causes each blade to rotate in a locked position as it forces the turbine to turn on its system axis. As the top and bottom bases continue to rotate with the blades in a locked position on the system axis, when each blade senses the opposing water current, it begins to rotate on its individual axis from its locked position to approximately 120 degrees in accordance with water current speed. Once an individual blade begins to rotate on its axis, it rotates relatively quickly to approximately 120 degrees. The top and bottom plates continue to rotate through the fluid and each blade begins reversing movement in a clockwise direction through the fluid to a path of least resistance (i.e., little to no drag) wherein the blade remains in a neutral position pivoting clockwise on its individual axis to the locked position again and thus generating force to continue rotating the turbine.

The system and therefore the blades can be configured to rotate counterclockwise or clockwise.

In a further embodiment, a reactive turbine system may include a turbine having a plurality of blades being configured for communication with a flow of fluid, the turbine further comprising a top base and a bottom base, a system axis, and respective individual axes for each blade, wherein the top and bottom bases rotate on the system axis causing the reactive turbine blade to rotate until the blade contacts a flow of water on an opposing side of the system, each blade swinging approximately 120 degrees during each rotation. The plurality of blades may form a five-star rotation pattern, or more, depending on the number of blades. Still further, a blade width ratio in an exemplary 5-star arrangement may be approximately ⅔ to ½ of a base diameter to permit each blade to rotate past a locked-in trailing or "forcing" blade. A guard or cage may be arranged around the turbine blades and may turn with the blades or remain stationary. The guard also may be used as a reversal blade to control blade swing and maintain blade alignment. The blades and the system can be arranged to rotate clockwise or counterclockwise.

Other embodiments include the foregoing and other elements and steps described herein, and their equivalents, in various combinations. These and other embodiments of the present disclosure may be utilized in systems and methods, for instance, as described in International Application Number PCT/US19/28509, entitled Continuous Fluid Flow Power Generator, incorporated herein by reference thereto in its entirety.

Additional objects and advantages of the present subject matter are set forth in, or will be apparent to, those of ordinary skill in the art from the description herein. Also, it should be further appreciated that modifications and variations to the specifically illustrated, referenced, and discussed features, processes, and elements hereof may be practiced in various embodiments and uses of the disclosure without departing from the spirit and scope of the subject matter. Variations may include, but are not limited to, substitution of equivalent means, features, or steps for those illustrated, referenced, or discussed, and the functional, operational, or positional reversal of various parts, features, steps, or the like. Those of ordinary skill in the art will better appreciate the features and aspects of the various embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which refers to the appended figures, in which.

DETAILED DESCRIPTION OF THE DISCLOSURE

Figure 1:
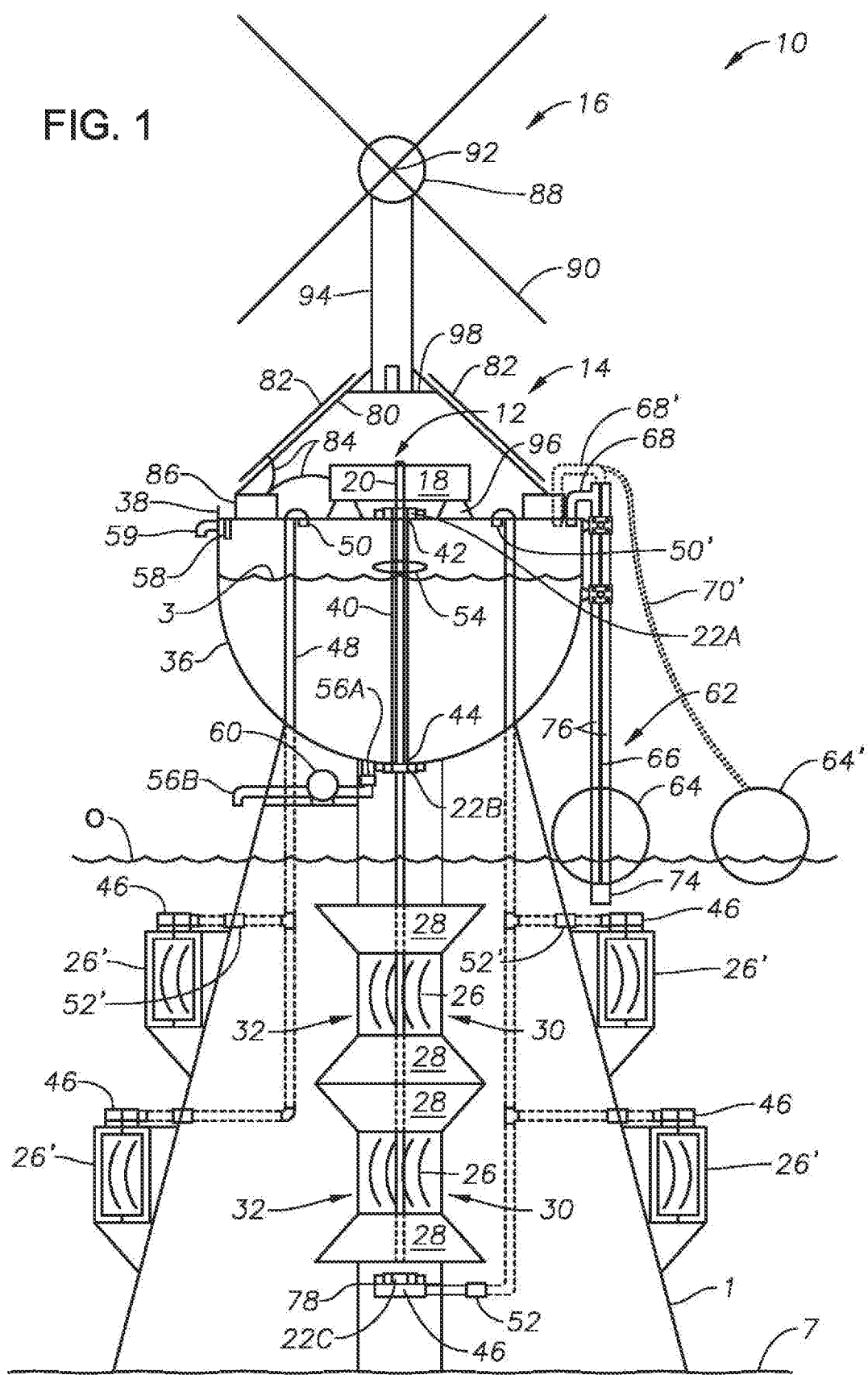
FIG. 1 is an elevational, schematic view of a system for continuous electricity production according to an aspect of the disclosure, including representative parts shown in cross section, phantom, and/or truncated for clarity.

As required, detailed embodiments are disclosed herein; however, it is to be understood that the disclosed embodiments are merely exemplary and may be embodied in various forms. Therefore, specific structural and functional details disclosed herein are not to be interpreted as limiting, but merely as a basis for the claims and as a representative basis for teaching one skilled in the art to variously employ the exemplary embodiments of the present disclosure, as well as their equivalents.

Unless defined otherwise, all technical and scientific terms used herein have the same meaning as is commonly understood by one of ordinary skill in the art to which this disclosure belongs. In the event that there is a plurality of definitions for a term or acronym herein, those in this section prevail unless stated otherwise.

Wherever the phrase "for example," "such as," "including" and the like are used herein, the phrase "and without limitation" is understood to follow unless explicitly stated otherwise. Similarly, "an example," "exemplary" and the like are understood to be non-limiting.

The term "substantially" allows for deviations from the descriptor that do not negatively impact the intended purpose. Descriptive terms are understood to be modified by the term "substantially" even if the word "substantially" is not explicitly recited.

The term "about" when used in connection with a numerical value refers to the actual given value, and to the approximation to such given value that would reasonably be inferred by one of ordinary skill in the art, including approximations due to the experimental and or measurement conditions for such given value.

The terms "comprising" and "including" and "having" and "involving" (and similarly "comprises," "includes," "has," and "involves") and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etcetera. Thus, for example, "a device having components a, b, and c" means that the device includes at least components a, b, and c. Similarly, the phrase: "a method involving steps a, b, and c" means that the method includes at least steps a, b, and c.

Where a list of alternative component terms is used, e.g., "a structure such as 'a,' 'b,' 'c,' 'd' or the like," or "a" or b", such lists and alternative terms provide meaning and context unless indicated otherwise.

Unless the context clearly requires otherwise, throughout the description and the claims, the words "comprise," "comprising," and the like are to be construed in an inclusive sense as opposed to an exclusive or exhaustive sense; in the sense of "including, but not limited to."

Any discussion of prior art in the specification should in no way be considered as an admission that such prior art is widely known or forms part of common general knowledge in the field.

The various embodiments of the disclosure and/or equivalents falling within the scope of present disclosure overcome or ameliorate at least one of the disadvantages of the prior art or provide a useful alternative.

Detailed reference will now be made to the drawings in which examples embodying the present subject matter are shown. The detailed description uses numerical and letter designations to refer to features of the drawings. The drawings and detailed description provide a full and written description of the present subject matter, and of the manner and process of making and using various exemplary embodiments, so as to enable one skilled in the pertinent art to make and use them, as well as the best mode of carrying out the exemplary embodiments. The drawings are not necessarily to scale, and some features may be exaggerated to show details of particular components. Thus, the examples set forth in the drawings and detailed descriptions are provided by way of explanation only and are not meant as limitations of the disclosure. The present subject matter thus includes any modifications and variations of the following examples as come within the scope of the appended claims and their equivalents.

Turning now to FIG. 1, a continuous fluid flow power generator according to an aspect of the disclosure is designated in general by the element number 10. The power or electricity generator 10 is installed on an exemplary tapered foundation or base 1 anchored at a bottom 7 of the ocean or other open water O to take advantage of continuous current flows and wave action. The power generator 10 broadly includes a turbine generator assembly 12, a solar power assembly 14, and a windmill assembly 16. The exemplary turbine generator assembly 12 may include a generator 18, a turbine shaft 20, a first or top end bearing 22A, a second or mid-bearing 22B, and a third or bottom end-bearing 22C. A central turbine or turbine blades 26 are shown between diffusing doors 28 having respective intakes or openings 30, 32 to receive a flow of water O to turn the turbine blades 26 to generate electricity.

Positioned below the bearing 22C in FIG. 1 is a pump brace or flooring 78 to anchor or hold the bearing 22C and a submersible pump 46. Here, the submersible pump 46, which has a water intake valve (not shown), is in communication with a check valve 52 located in a water pipe 48 to fill a water container 36. The check valve 52 prevents the water that is already in the pipe 48 from flowing back toward the pump 46 to prevent pumping against gravity. As shown, multiple submersible pumps 46 may be provided, such as in a stacked arrangement to increase water pumping capacity.

As further shown in FIG. 1, the water pipe 48 terminates at an outlet or nozzle 50 to fill the water container 36 with water 3. A safety fence 38 may be provided to prevent debris or personnel from falling into the open water O. As the water level 3 rises or recedes, it respectively lifts or lowers a buoy or float device 54 that travels up and down a pipe or conduit 40, which surrounds the turbine shaft 20. As further shown the pipe 40 has a first or top end 42 near the top bearing 22A and another end 44 near the bearing 22B. When the float 54 rises to a predetermined or preset height near the top end 42, the float 54 trips or opens a dumping valve 56A that releases the water 3 from a nozzle or aperture 56B into the open water O. Here also, a secondary water sensing device or safety valve 58 is provided to open the dumping valve 56A and release the water 3. As the water 3 is released into the ocean O it activates a hydro turbine generator 60 to contribute to energy generation by the system 10. An "empty sensor" (not shown) may also be provided to close or shut the dumping valve 56A in the event that the tank 36 is empty to prevent potential damage to the hydro turbine generator 60. Conversely, an overflow nozzle 59 may also be provided in the event the water 3 reaches an overfill condition in the tank 36 for any reason.

FIG. 1 also shows additional sets of turbine blades 261, also known herein as a "kick turbines," that may be provided to generate still more electricity resulting from an accelerated water stream flowing from the central turbine blades 26 described above. Here, the kick turbines 261 are shown schematically but can be mechanically connected to or near the base 1 and tied into one or more water pipes 48 to help fill the water container 36 with water 3. At least one kick turbine 261 may be provided level with the openings 30, 32, and multiple additional kick turbines 26' can be arranged sequentially as shown to further fill the container 36. Moreover, provided sufficient depth of the ocean O, additional diffusing doors and turbine assemblies may be positioned below and in line with the blades 26 and diffusing doors 28. Each of these additional assemblies may have accompanying kick turbines 261 arranged at the level of their respective turbine assemblies 26 to achieve maximum water flow across the blades of the kick turbines 261. Respective submersible pumps 461 also may be provided in communication with the kick turbines 26' to fill the water container 36 as described above with respect to turbine 26 and pump 46.

FIG. 1 further shows a pumping or float and piston assembly 62 in communication with the water container 36 via a water pipe 66. A walkway or platform 98 may be provided to which the pumping assembly 62 may be attached for additional structural support and maintenance access. Additionally, the exemplary platform 98 may be an enclosed room to shield equipment. A beach-ball-shaped float 64 (although other shapes may be used) is slidably attached around pumping rods 76 that in turn surround the pipe 66. As the float 64 moves up and down due to wave action of the ocean O, it draws water into a piston pump 74 that delivers water into the container 36 via a nozzle or valve 68, which contributes to the action of the float 54 and activation of the hydro turbine generator 60 described above. For clarity, only one float and piston assembly 62 is shown in FIG. 1, but multiple float and piston assemblies may be used.

FIG. 1 also shows another pumping assembly or pump and float assembly 621. Here, a float 641 may be attached via a piston pump handle 701 to deliver water 3 via a nozzle 681 (shown in phantom for clarity). As the float 641 moves up and down due to wave action of the ocean O, it draws water into the piston pump 74 that delivers water into the container 36 via the nozzle 681, which contributes to the action of the float 54 and activation of the hydro-turbine generator 60 described above. The pumping assemblies 62, 621 may be utilized in the alternative, or they may be interspersed around the water container 36 as described below.

With reference now to the solar power assembly 14 in FIG. 1 as briefly introduced above, a hip roof 80 may be provided to cover the generator 18 of the assembly 14. The roof 80 may be overlaid with solar panels 82. Therefore, while the turbine generator assembly 12 as explained above is constantly generating electricity via water and current action, the solar panels 82 also may be contributing to power generation and electricity storage in a battery 86, which is in electrical communication with the solar panels 82. Also shown schematically are electrical cables or connections 84 connected between the panels 82 and the battery 86. However, if the assembly 14 is located in proximity to land, the solar-generated electricity can be transmitted directly to a power or electrical grid rather than stored in the battery 86.

With continued reference to FIG. 1, the windmill 16 briefly introduced above includes a power generator 88, which, like the solar panel assembly 14, is electrically connected to the battery 86 (or electrical grid) via electrical lines 84. In this example, the windmill 16 includes three or more exemplary blades 90 that are connected to a shaft 92, which extends from the power generator 88. The windmill 16 and its blades 90 are erected on and supported by a shaft 94 that is connected to a base or brace 96 that may be installed on the hip roof 80 described above. As the turbine generator assembly 12 and the solar panel assembly 14 are respectively generating electricity via water and current action and sunlight, the windmill 16 also may be contributing to power generation and electricity storage in the battery 86 (or feeding the electrical grid) as the wind blows, particularly on the open ocean O.

Figure 2:
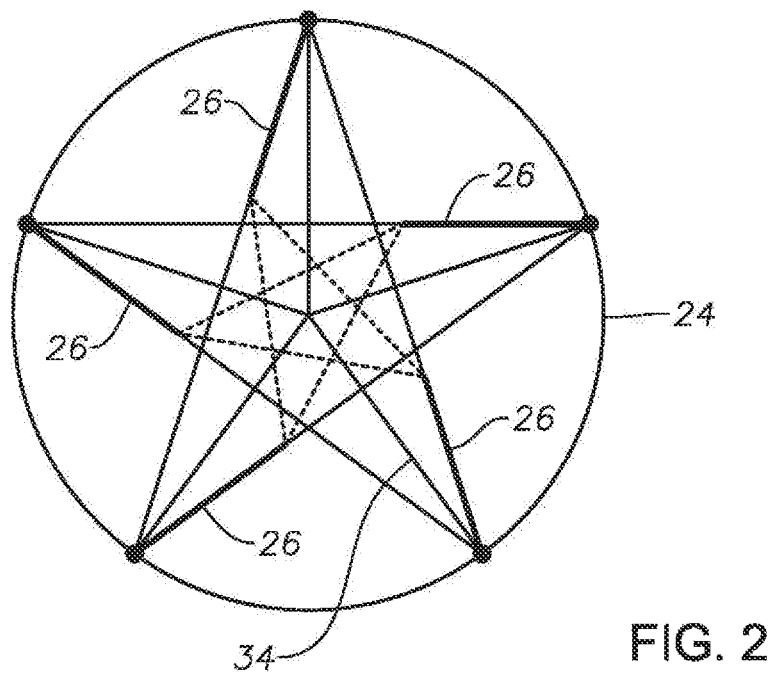
FIG. 2 is a schematic plan view of a base of the system as in FIG. 1, particularly showing a pattern formed by a rotation of the system and individual blades.
Figure 3:
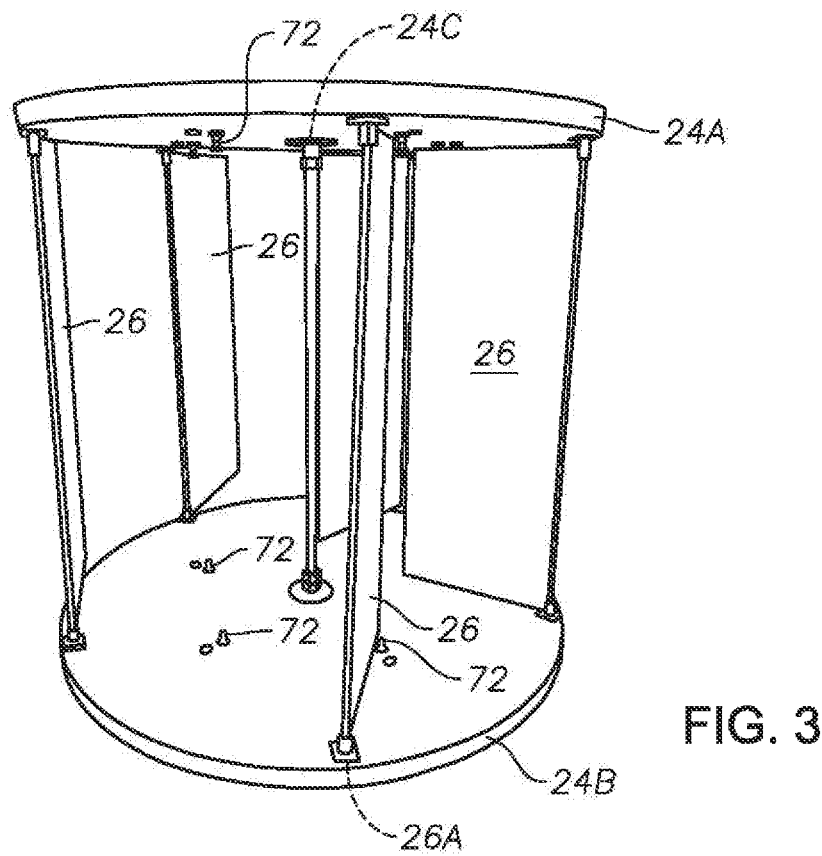
FIG. 3 is a perspective view of a turbine system as may be used in FIG. 1.
Figure 4:
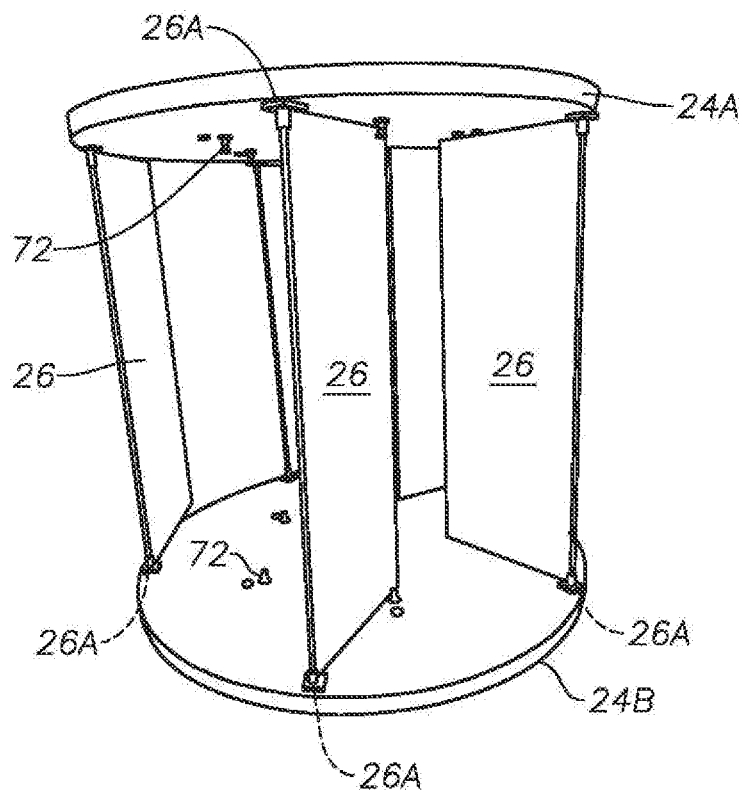
FIG. 4 is another perspective view of the turbine system as in FIG. 3, particularly showing individual blade positions as the system rotates.
Figure 5:
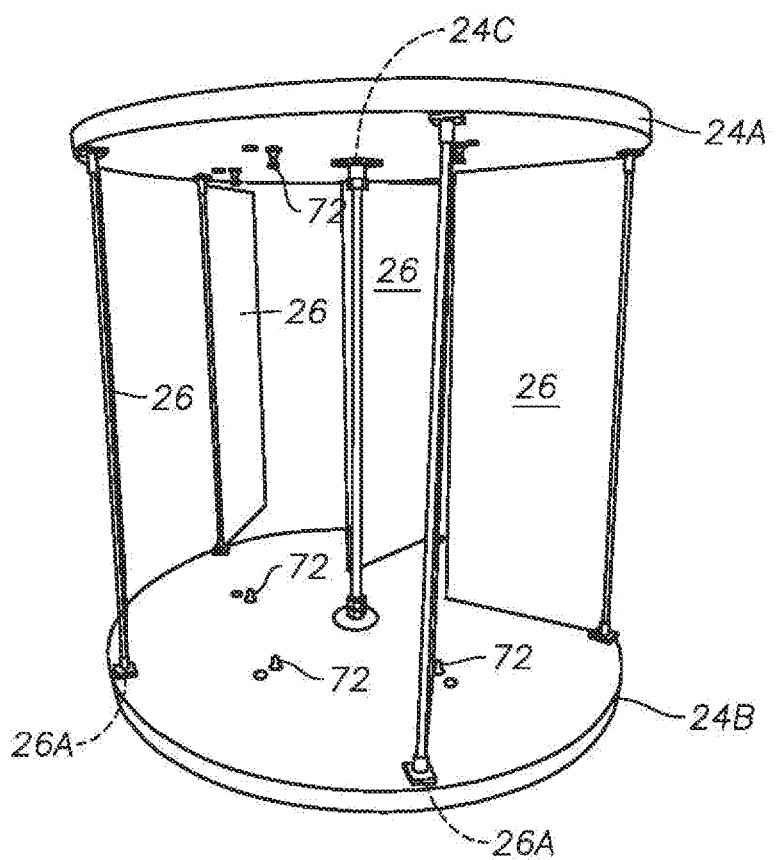
FIG. 5 is a further perspective view of the turbine system as in FIG. 3.
Figure 6:
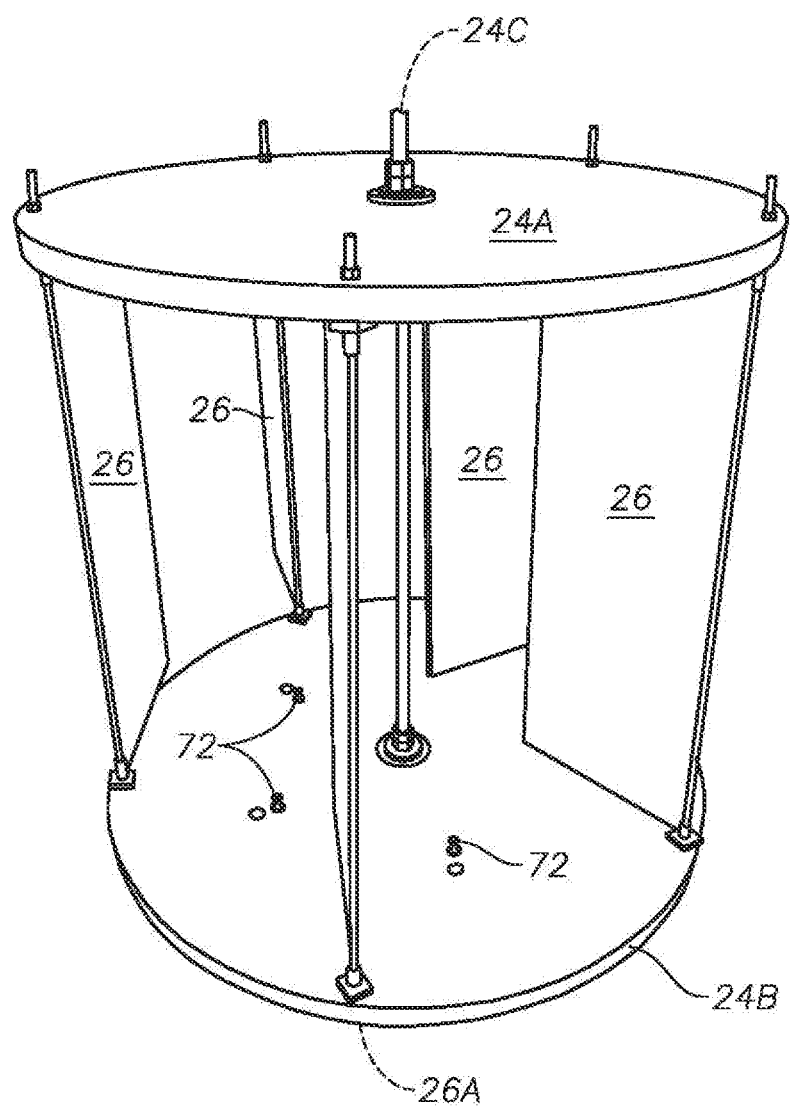
FIG. 6 is another perspective view of the turbine system as in FIG. 3.

Turning now to FIG. 2, a moving footprint of each blade 26 is shown as fluid flows against each blade 26 while the turbine system as whole rotates (see FIG. 1). As FIG. 2 shows, the footprint of each blade 26 is approximately two thirds of one half of the diameter 34 of the base 24 while the other third of open space permits water to push against the two blades in front of a respective blade 26 resulting in smooth rotation of the turbine and greater efficiency. As shown, the moving footprint of each blade 26 results in a star pattern is created by the blade movement. More particularly, when the force of water hits the reactive turbine blade 26, it locks into position on one side which causes a counterclockwise spin effect because of its own individual axis pivot point and angle of locking position as explained in more detail below.

With reference to FIGS. 2, 3, 4, 5, and 6, as a top frame 24A and a bottom frame 24B rotate counterclockwise on a central axis 24C, each reactive turbine blade 26 also rotates on its individual axis 26A until the turbine blade 26 hits the forces and flow of water on the opposite side of the turbine. This causes the reactive turbine blade 26 to react quickly and rotate on its respective axis point 26A fully counterclockwise approximately 120 degrees as a function of water speed until it contacts a stop or check strut 72. As the top and bottom frames 24A, 24B continue to rotate counterclockwise on the center axis point 24C, the reactive turbine blade 26 continues to rotates on its axis point 26A and returns to a clockwise rotation (see FIGS. 7A-7C below) while cutting through the water to find its own path of least resistance and remaining in a neutral position pivoting on its own axis 26A as it cuts through the opposing water currents.

The exemplary turbine blades 26 in FIG. 3-6 can work vertically, horizontally, or at an angle, such as 45 degrees, as well as clockwise or counterclockwise according to blade angle and locking position. It can rotate the same direction when tidal currents change and work solely by itself without any choking or funneling effect. The "star" design (see FIG. 2) enables the reactive blade turbine system to harness the power of water currents with nearly 100% of efficiency based on the square foot area and angles of the blades 26 at any given moment as each blade 26 rotates on its individual axis 26A from the force of the moving water currents, regardless of constant or changing current direction.

Again, as the top and bottom 24A, 24B continue to rotate counterclockwise in FIGS. 3-6, each reactive turbine blade 26 returns to a clockwise rotation in a neutral posture until it encounters the force of water on the other side and is locked back into position. When this reaction takes place, and because of the pivot point and locking point of the angle blade of the reactive turbine blade 26, the reactive turbine blade 26 is caused to rotate on its axis 26A in a clockwise, locked position. Also, when this reaction occurs and because of the axis pivot points and locking point of the reactive turbine blade's angle, the water currents forced against a surface area of the reactive turbine blade create a spinning, high-torque effect to create electrical power or pump water.

Figure 7A:
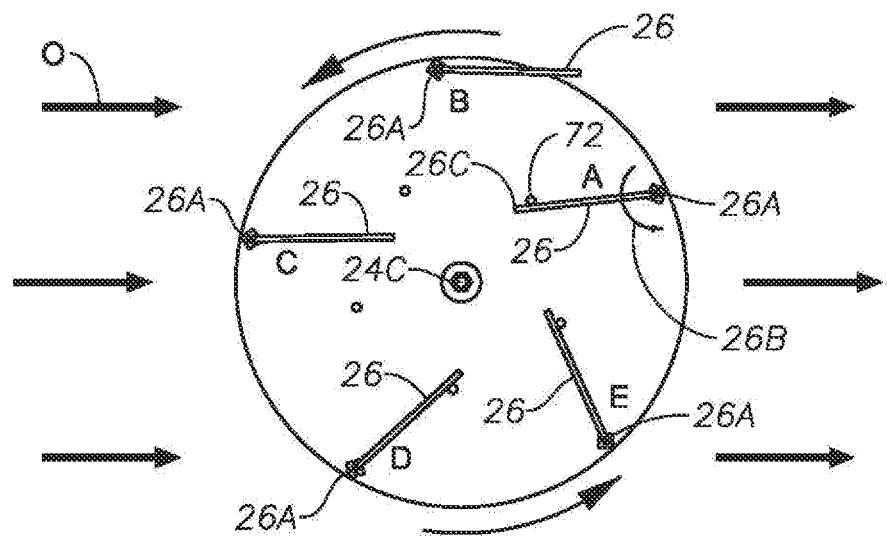
FIG. 7A is a plan view of a portion of a turbine system according to an aspect of the disclosure, particularly showing the turbine spinning counterclockwise due to an exemplary water current and further showing individual blades turning counterclockwise.
Figure 7B:
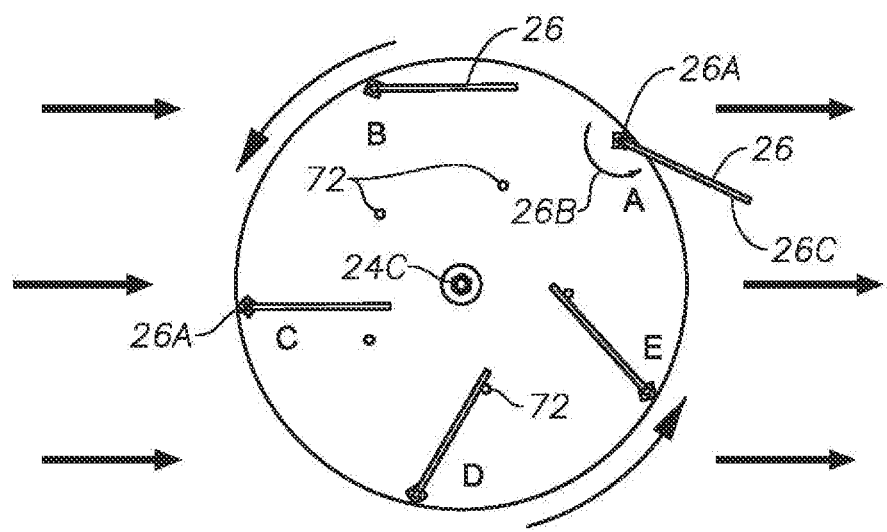
FIG. 7B shows the individual blades as in FIG. 7A continuing to turn counterclockwise.
Figure 7C:
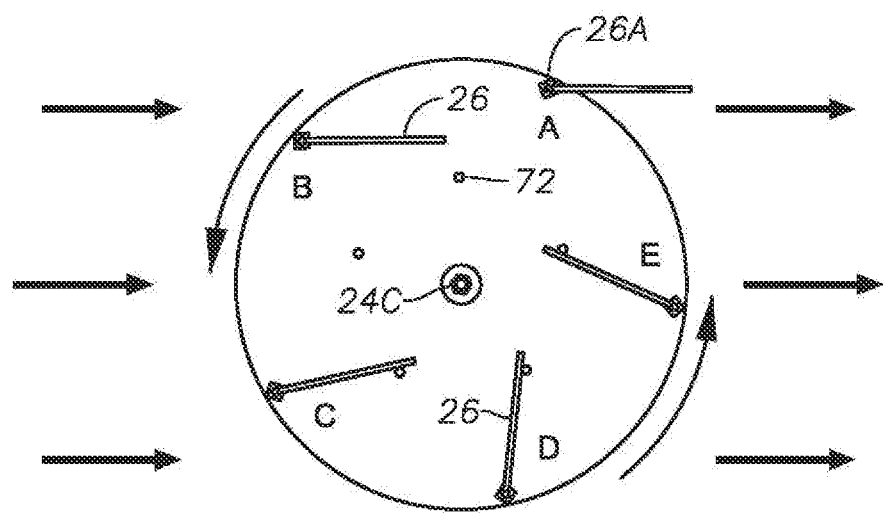
FIG. 7C further shows the individual blades as in FIG. 7A continuing to turn counterclockwise.

Turning now to FIGS. 7A, 7B and 7C, a reactive blade turbine system is shown installed in a moving body of water O. Here, the fluid O is flowing or coming from a left direction into a side of the turbine and exiting the blades 26 to the right (the current direction of the water O could be reversed). In this example, the reactive blade turbine system is caused to rotate counterclockwise, as indicated by the curved arrows shown above and below the system.

As shown in FIG. 7A, the individual turbine blades 26 are rotating counterclockwise on their respective axes 26A as a result of the opposing water currents causing an individual turbine blade 26 to swing to its left as indicated by arrow 26B at position A. More particularly, as the water O flows from left to right in FIG. 7A, it begins to act on a surface 26C of the blade 26 which is temporarily immobilized at strut 72 at position A. At the same time, blades 26 at positions B, C, D, and E are being acted upon by the current flow O, ranging from neutral positions B and C (i.e., aligned with the current flow O) to locked positions against struts 72 at positions D and E, which cause the flow O to push against those blades 26 and rotate the system in the counterclockwise example shown.

More particularly, in FIG. 7B the left-most blade 26 at position C has rotated further counterclockwise on its individual axis 26A (relative to where that blade was when in position A) toward a neutral position in response to the fluid flow O while the system as a whole has rotated further counterclockwise. FIG. 7C shows both the system and the individual blades 26 continuing to rotate counterclockwise until each blade 26 resumes a neutral position and repeats the cycle. Each of the blades 26 move accordingly and cause the reactive blade turbine system to rotate with the fluid flow O more efficiently. Due to the passive or neutral positions B and C in this example—temporarily assumed by each blade 26 during system rotation—at no point does a blade 26 remain fixed such that it works against the fluid flow O and the rotation of reactive blade turbine system. Thus, the efficiency of the reactive blade turbine system and its power output are maximized. Still further, due to the star pattern (see FIG. 2), any fluid O flowing in the vicinity of the edge of any blade 26 near the main shaft 24C will strike a leading portion of those blades 26 to create further rotation and to further increase efficiency.

The Reactive Blade Turbine System as shown in FIGS. 7A-7C could be installed with generator systems near land, under or alongside boat hulls, under or beside boat docks, et cetera to generate electricity to charge a battery, or excess energy can be transferred to a general electrical distribution grid.

Figure 8:
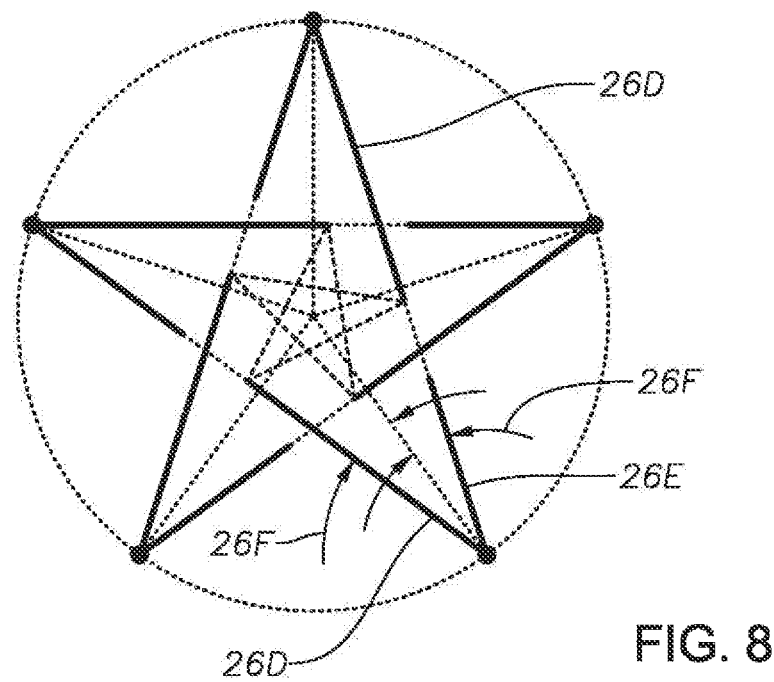
FIG. 8 is a plan view of a base of an exemplary 5-point system, particularly showing two exemplary blade lengths and rotation angles from center.
Figure 9:
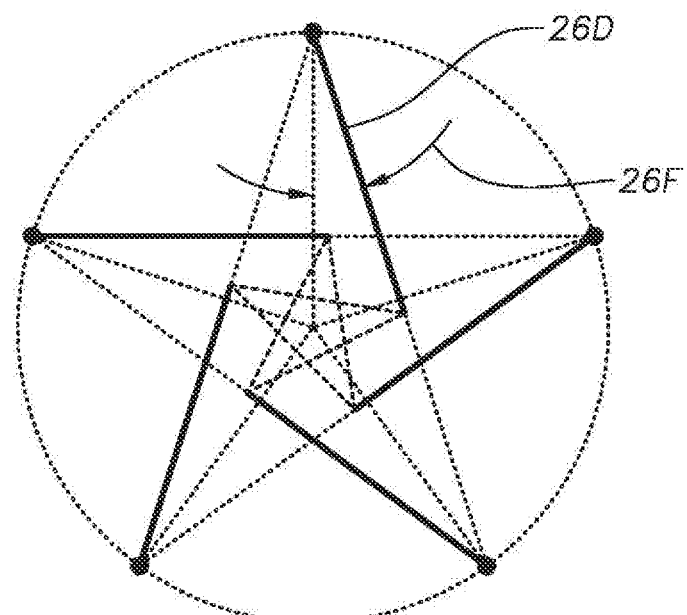
FIG. 9 is a plan view of the base as in FIG. 8, particularly showing a left of center rotation of a relatively longer blade.
Figure 10:
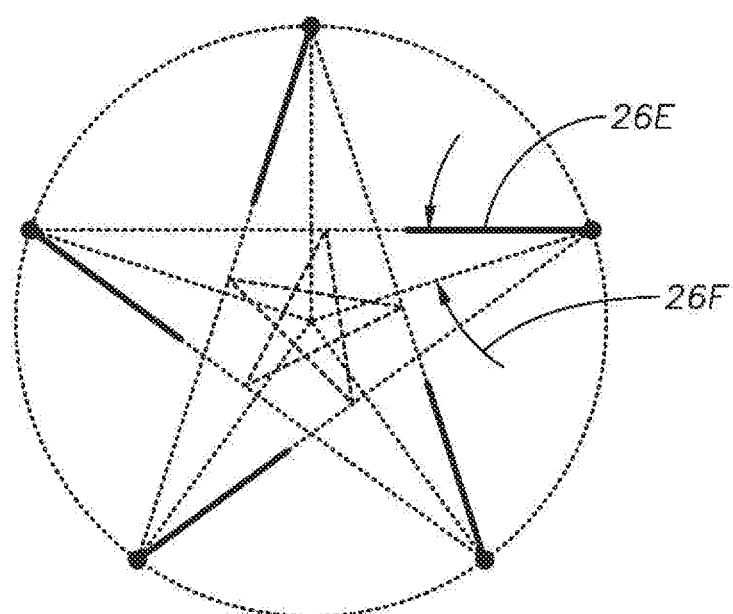
FIG. 10 is a plan view of the base of as in FIG. 8, particularly showing a right of center rotation of a relatively shorter blade.

Turning now to FIGS. 8, 9, and 10, exemplary blade angles, blade widths, and blade lengths are shown that can be used in a star-pattern to force water into the blades 26 for increased turbine efficiency. In FIG. 8, longer blades 26D and shorter blades 26E are schematically shown together to compare their relative lengths, while FIG. 9 shows the longer blades 26D and FIG. 10 shows the shorter blades 26E. As shown, each of the blades 26D and 26E, no matter their length, will be offset from a center line of a 5-star pattern by approximately 18 degrees, as indicated by 26F. Also, thicknesses of the vanes or blades 26D, 26E will be determined and selected according to turbine size to provide appropriate strength. The blade thickness will be calculated with the degree offset to the blade stopping position, which may be a relatively small stopping post for smaller models, or a larger rod or square stock for larger turbines (see exemplary discs 24A, 24B and struts 72 in FIG. 3). In summary, the front face of a blade should be approximately at the 18-degree mark and account for a thickness of each blade, and the stopping position post or rod will be positioned to ensure that all blades 26 have the same relative positions and dimensions.

With a 5-star pattern as shown FIGS. 8, 9, and 10, for each blade 26D (or 26E) to reverse without coming into contact with a locked-in trailing or forcing blade when the first reactive, reversible blade reverses angles in an opposing water current, a blade-width ratio is approximately ½ of the full diameter of the base or discs (top and bottom) for the blade to be able to rotate past the trailing blade; i.e., approximately 18 degrees from left of center of a five star pattern mark. This ratio permits the blades to work smoothly as they each reverse angle to a neutral position on the opposing side of the turbine as it is rotating in a counter-clockwise position. As each blade travels into a neutral position there is no drag on the blade. The blade continues to turn in a clockwise position until it hits the locking position to create force and torque on the turbine shaft as it turns. More specifically, the blade reversal is created by opposing water currents, and enjoys a low differential behind the trailing blade.

By using a ratio of approximately ⅔ width of the diameter to ½ blade, each blade can rotate without hitting a trailing blade. This arrangement also creates an open area of approximately ⅓ of ½ the diameter of the base for the water currents to strike, which forces water into multiple leading blades. Accordingly, a greater square foot area of multiple blades is affected by the force on more blades which in turn creates a more efficient and smoother functioning turbine.

As further shown in FIGS. 8, 9, and 10, when a blade reverses, it travels approximately 120 degrees to a neutral position as a function of water current velocity, and as the turbine moves in the counterclockwise position, the blade travels in a neutral clockwise position with no drag on the opposing water current side until it hits the locking position to create force and torque on a center axis of the turbine shaft. This creates electrical energy through a generating system that is connected to the shaft manually or magnetically to create a turning force to make electrical energy.

Although a five-bladed arrangement is shown by example in FIGS. 8, 9, and 10, turbines according to the disclosure can use a six-star and other star patterns by changing the ratio of blade width and opening so that each blade can rotate by a respective trailing, locked-in blade similar to the five star blade pattern footprint described above. More particularly, when a blade in a five or more blade arrangement reverses, that blade will be directly in line with a second neutral blade in front of the subject blade each time the blade turns. In other words, 5 or greater blades with ratios described above are more efficient than conventional turbines using 90-degree patterns. The star arrangements according to the present disclosure thus produce cleaner energy due to smoother rotation. In contrast, thinner, fewer blades on 90-degree axes suffer from a "jerking" effect when those blades reverse, which is exacerbated as the conventional blades as a flow of water hits a gap between the blades.

FIGS. 8, 9, and 10 further show that a five-star pattern can be arranged on either side of the 18-degree-from-center mark. In other words, a wider blade can be placed on the left side of center thus causing the blade to generate additional power and or rotate fewer degrees (swing less) when the blade reverses. Less swing in turn reduces jerking action and prevents the blades from slamming into a stopping position on a post, brace, or peg because the blade clutches or slows into a stopped position earlier as it approaches from a neutral position. By way of example, in a counterclockwise direction:

1. 18 degrees from right of center in a five-star pattern: blade width ratio is approximately ⅔ blade width of ½ of the full diameter to permit the blade to rotate past a locked-in or trailing and forcing blade.
2. 18 degrees from the left side of the center in a five-star pattern: blade width ratio is approximately ½ of the full diameter to permit the blade to rotate past a trailing blade.
3. In a six-blade or greater star pattern, the degree of movement will be reduced slightly, and blade widths would decrease slightly since the star points will be closer together.
4. Differing angles of star patterns concentrates water or fluid flow to push the water or fluid into the other blade angles thereby creating a more efficient and smoother rotation. This in turn generates force and torque on the turbine shaft such that one or another of the disclosed star patterns might be preferable according to different water velocities.
5. An exemplary turbine with reversing blades stops controls a degree of rotation of each blade as it reverses and also keeps the blades in proper angles of rotation. In a situation in which tides or currents slow and change directions, the blades will revert to correct positions and restart no matter which way water or currents or flowing for smoother operation. A cage or screen system can also control rotation depending on turbine size and a gap formed between the cage and an edge of the wheel, disc, or base edge around each end of the turbine.
6. If the direction is reversed from the foregoing example such that the turbine turns clockwise, the respective blades would switch sides, and the stopping braces would be on the other side of the blades.

Figure 11:
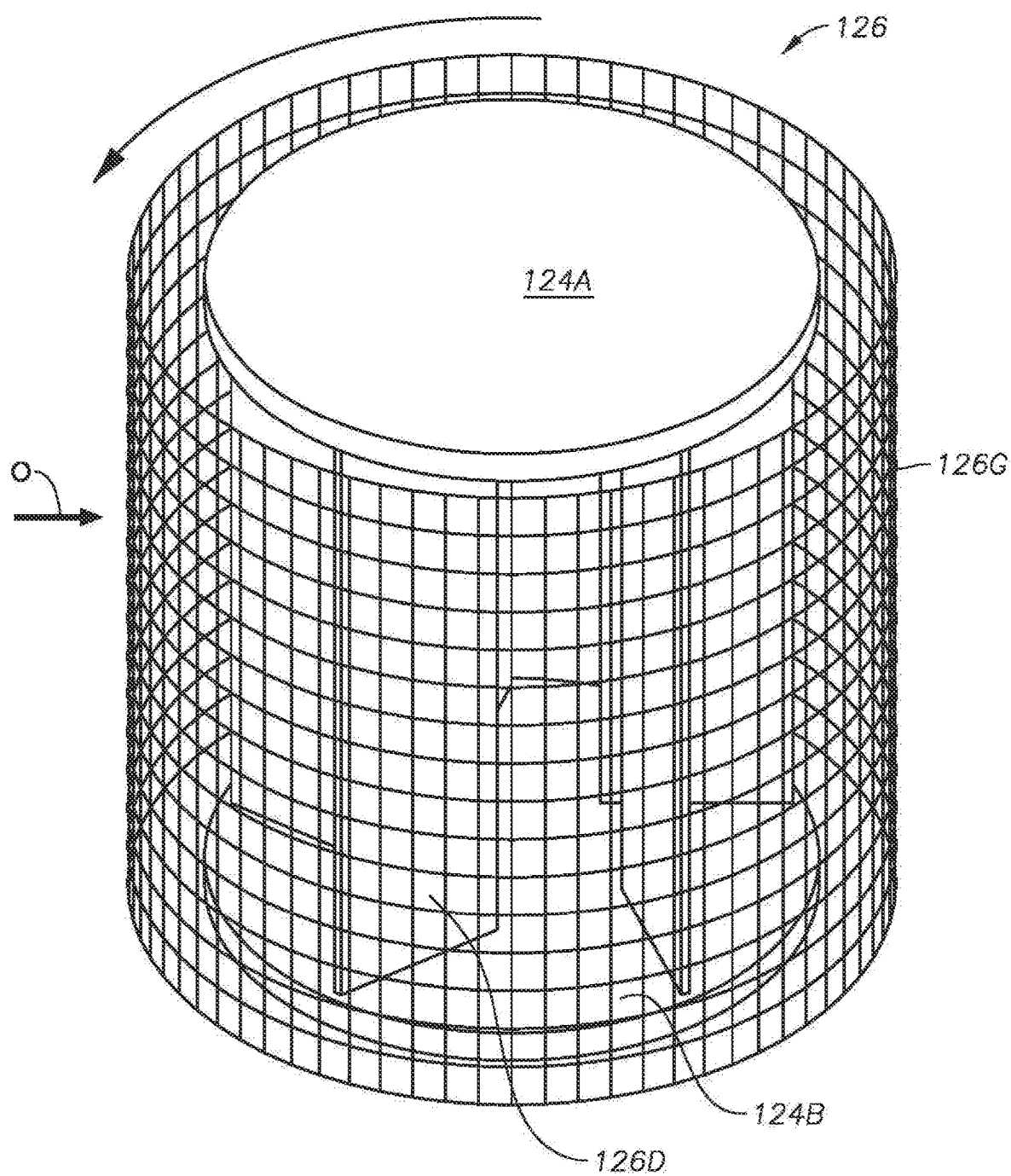
FIG. 11 is a perspective view of a guard arranged around an exemplary turbine system.

FIG. 11 shows a screen system connected to a turbine system 126 according to another aspect of the disclosure. Here, a screen, cage, or guard 126G rotates with a turbine as the turbine rotates with a water current O as indicated by the curved arrow, which deflects debris, fish, and the like away from the turbine. The screen 126G can be made from materials suitable for water immersion and resistant to corrosion and debris impact and may be connected to turbine in different ways. The screen 126G can be manufactured in a variety of shapes and styles. Although shown schematically attached to bases 124A, 124B of the system 126D which cause the screen 126G to rotate with the system 126D, the screen 126G can be made stationary relative to the bases 124A, 124B. Additionally, reversing blade stops or a cage screen system can control the reversing blades 126D and maintain the blades 126D in proper alignment when tides change such that the turbine will begin rotation and the blades 126D will automatically return to correct positions to continue generating a rotational force.

Figure 12:
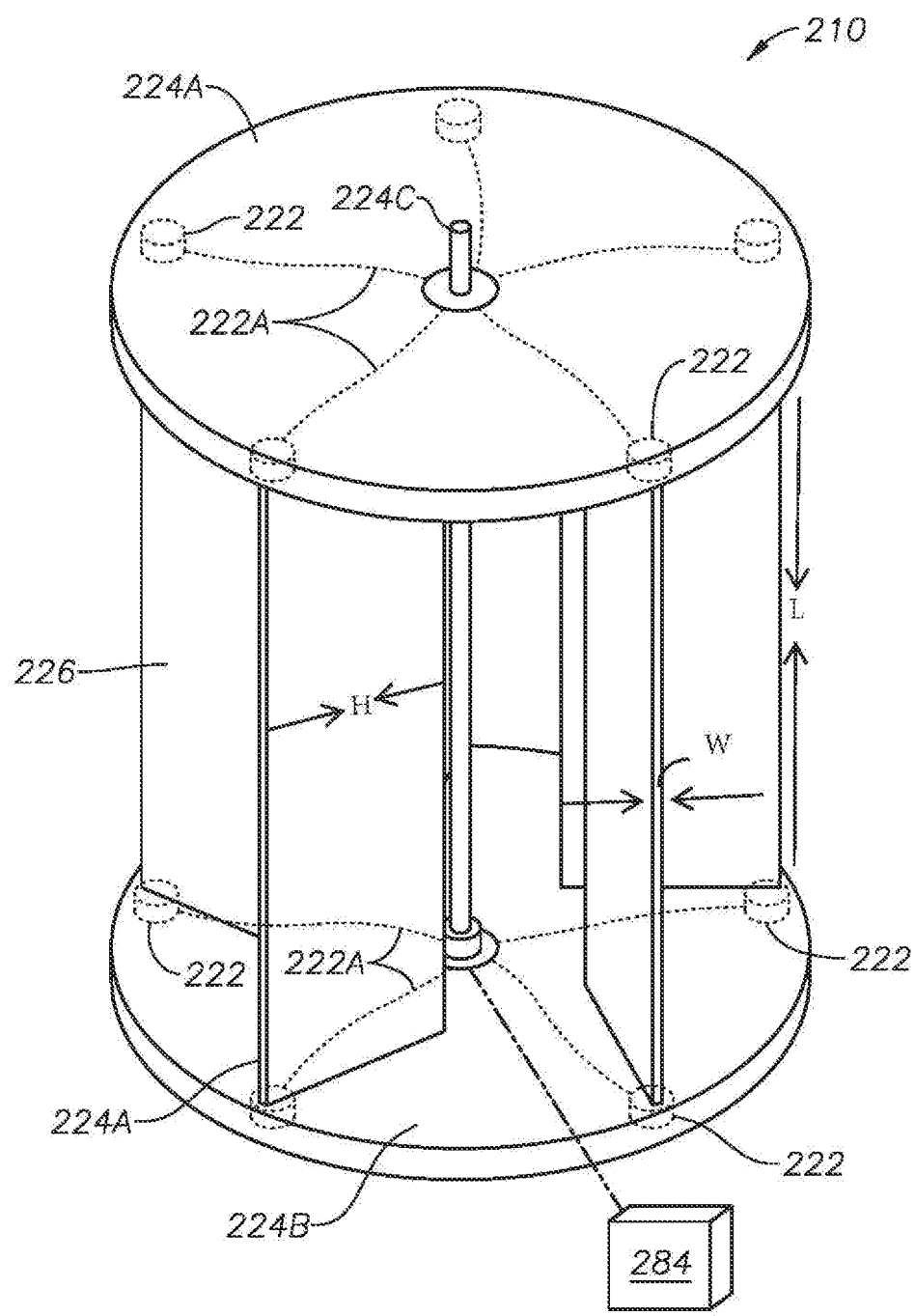
FIG. 12 is a perspective view of a secondary-energy production system in an exemplary turbine system.

With reference now to FIG. 12, secondary energy-capture systems can be utilized with an exemplary turbine system 210. Here, in addition to the energy production by the primary rotation of the turbine system 210 along a main or central axis 224C, each blade 226 can utilize individual electrical slip rings or bearings, labeled as element 222 at each end of an individual blade axis 224A. As shown, each blade 226 can have the bearings 222 (shown in phantom) embedded in wheelbases 224A, 224B. And each of the top and bottom bases 224A, 224B can be wired, or be in wireless communication, as indicated schematically by 222A, from the bearings 222 to the main axis 224C. The collective energy output (from the turbine blades 226 and each individual blade bearing 222) can be transmitted as indicated by wire or a wirelessly to a power collection receptacle 284, perhaps to a power station on shore or a nearby capacitor.

More specifically, FIG. 12 schematically shows that each bearing 222 can be placed on or near each shaft 224A in different ways. The bearings 222 can be placed on a fixed shaft at multiple locations along the fixed shaft to support the blade with spacers or bushings or at each end of shaft so the whole shaft can rotate from each end on the shaft while the blade is fixed or connected to the rotating shaft. Bushings can be used on smaller models and also split bushings can be utilized without having to pull apart a shaft and blade assembly to make maintenance easier. The bearings and bushings can be made from suitable material and from a variety of shapes or sizes to accommodate different turbine sizes and scenarios.

FIG. 12 further shows each blade 226 has a width (thickness) W, a height H, and a length L. The blade width W can be between about 2% to about 5% of the length L to ensure appropriate structural strength to withstand rotational forces and/or torsional stresses. For instance, if the blade length L is 12 inches, then the blade thickness W can be approximately ¼ inch. Similarly, a 120-inch blade length L may have an associated width W of approximately 2-3 inches. These metrics can be adjusted according to the type of material used to construct the blades 226; e.g., stainless steel blades may not be as wide as aluminum blades 226.

Figure 13:
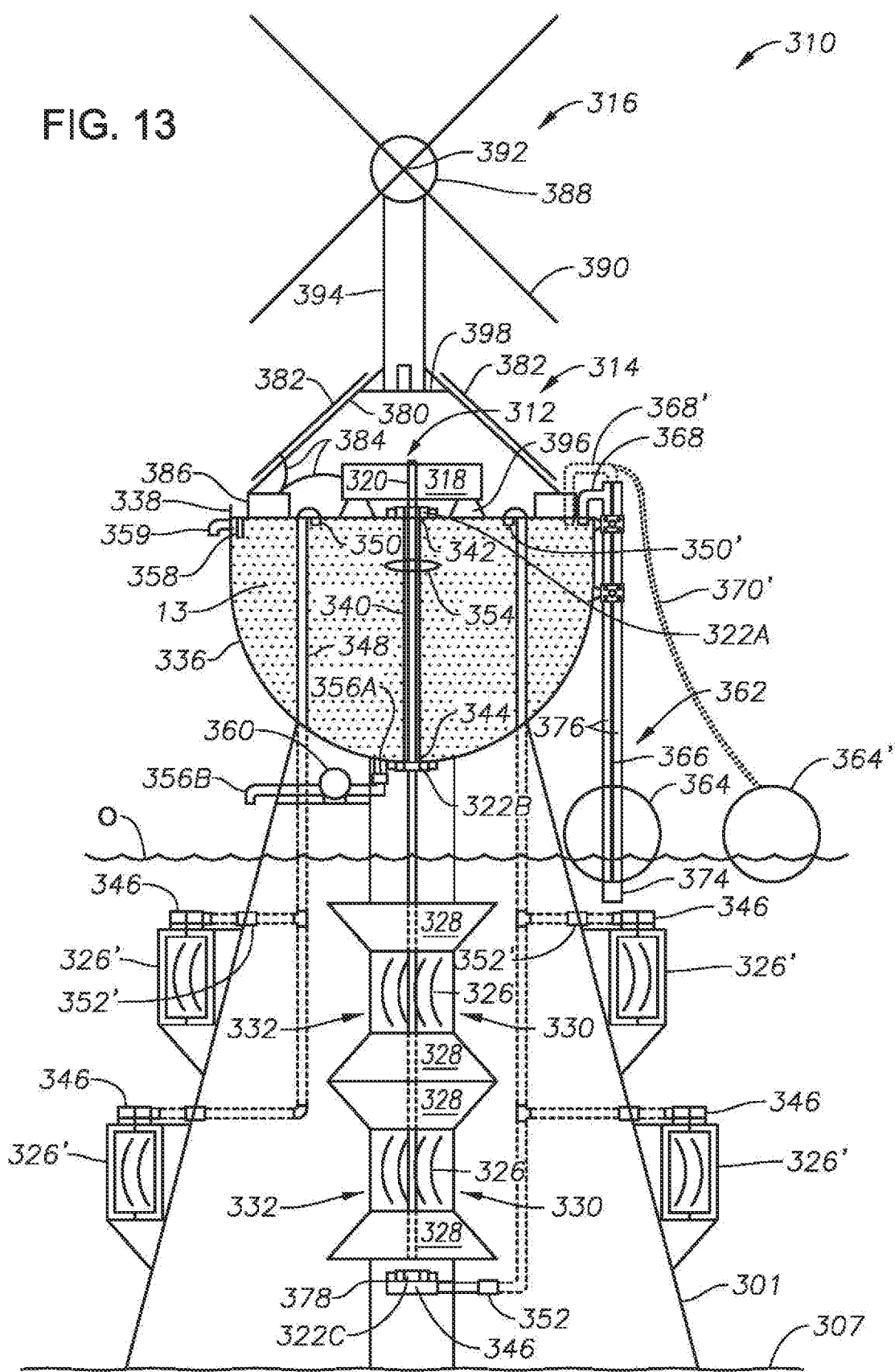
FIG. 13 is an elevational, schematic view of a system for continuous electricity production according to an aspect of the disclosure, including representative parts shown in cross section, phantom, and/or truncated for clarity, particularly showing alternative energy storage.

With reference now to FIG. 13, a continuous fluid flow power generator according to an aspect of the disclosure is designated in general by the element number 310. The power or electricity generator 310 is installed on an exemplary tapered foundation or base 301 anchored at a bottom 307 of the ocean or other open water O to take advantage of continuous current flows and wave action. The power generator 310 broadly includes a turbine generator assembly 312, a solar power assembly 314, and a windmill assembly 316. The exemplary turbine generator assembly 312 may include a generator 318, a turbine shaft 320, a first or top end bearing 322A, a second or mid-bearing 322B, and a third or bottom end-bearing 322C. A central turbine or turbine blades 326 are shown between diffusing doors 328 having respective intakes or openings 330, 332 to receive a flow of water O to turn the turbine blades 326 to generate electricity.

Positioned below the bearing 322C in FIG. 13 is a pump brace or flooring 378 to anchor or hold the bearing 322C and a submersible pump 346. Here, the submersible pump 346, which has a water intake valve (not shown), is in communication with a check valve 352 located in a water pipe 348 to fill a container 336. The check valve 352 prevents the water that is already in the pipe 348 from flowing back toward the pump 346 to prevent pumping against gravity. Although only one submersible pump 346 is shown in this example, multiple submersible pumps may be provided, such as in a stacked arrangement to increase water pumping capacity.

As further shown in FIG. 13, the water pipe 348 terminates at an outlet or nozzle 350 to fill the container 336. However, the container 336 may be used to store natural gas and/or hydrogen 13 rather than, or in addition to, water, such as by adding sealed compartments (not shown) in the container 336. Alternatively, or additionally, the hydrogen or natural gas 13 or water could be stored within an internal tower column or base 301 such as a core or other support structure within or connected to the base 301.

Also shown in FIG. 13, as the stored water or gas level 13 rises or recedes, it respectively lifts or lowers a buoy or float device 354 that travels up and down a pipe or conduit 340, which surrounds the turbine shaft 320. Here, a safety fence 338 is provided to prevent debris or personnel from falling into the open water O. As further shown the pipe 340 has a first or top end 42 near the top bearing 22A and another end 344 near the bearing 322B. When the float 354 rises to a predetermined or preset height near the top end 342, the float 354 trips or opens a dumping valve 356A that releases water (if stored) from a nozzle or aperture 356B into the open water O. Here also, a secondary water sensing device or safety valve 358 provided to open the dumping valve 356A and release water (if stored). As the water is released into the ocean O, it activates a hydro turbine generator 360 to contribute to energy generation by the system 310. An "empty sensor" (not shown) may also be provided to close or shut the dumping valve 356A in the event that the tank 336 is empty to prevent potential damage to the hydro turbine generator 360. Conversely, an overflow nozzle 359 may also be provided in the event the water (if stored) reaches an overfill condition in the tank 336 for any reason.

FIG. 13 also shows additional sets of turbine blades 3261, also known herein as a "kick turbines," that may be provided to generate still more electricity resulting from an accelerated water stream flowing from the central turbine blades 326 described above. Here, the kick turbines 3261 are shown schematically but can be mechanically connected to or near the base 301 and tied into one or more water pipes 348 to help fill the container 336 with water (if stored in a separate compartment). At least one kick turbine 3261 may be provided level with the openings 330, 332, and multiple additional kick turbines 326' can be arranged sequentially as shown to further fill the container 336. Moreover, provided sufficient depth of the ocean O, additional diffusing doors and turbine assemblies may be positioned below and in line with the blades 326 and diffusing doors 328. Each of these additional assemblies may have accompanying kick turbines 3261 arranged at the level of their respective turbine assemblies 326 to achieve maximum water flow across the blades of the kick turbines 3261. Respective submersible pumps 346' also may be provided in communication with the kick turbines 326' to fill the water container 336 as described above with respect to turbine 326 and pump 346.

FIG. 13 further shows a pumping or float and piston assembly 362 in communication with the container 336 via a pipe 366. A walkway or platform 398 may be provided to which the pumping assembly 362 may be attached for additional structural support and maintenance access. Additionally, the exemplary platform 398 may be an enclosed room to shield equipment. A beach-ball-shaped float 364 (although other shapes may be used) is slidably attached around pumping rods 376 that in turn surround the pipe 366. As the float 364 moves up and down due to wave action of the ocean O, it draws water into a piston pump 374 that delivers water into the container 336 (if stored in a separate compartment) via a nozzle or valve 368, which contributes to the action of the float 354 and activation of the hydro turbine generator 360 described above. For clarity, only one float and piston assembly 362 is shown in FIG. 13, but multiple float and piston assemblies may be used.

FIG. 13 also shows another pumping assembly or pump and float assembly 3621. Here, a float 3641 may be attached via a piston pump handle 370' to deliver water via a nozzle 368' (shown in phantom for clarity). As the float 3641 moves up and down due to wave action of the ocean O, it draws water into the piston pump 374 that delivers water into the container 336 (if a separate compartment is provided) via the nozzle 3681, which contributes to the action of the float 354 and activation of the hydro-turbine generator 360 described above. The pumping assemblies 362, 3621 may be utilized in the alternative, or they may be interspersed around the water container 336 as described below.

With reference now to the solar power assembly 314 in FIG. 13 briefly introduced above, a hip roof 380 may be provided to cover the generator 318 of the assembly 314. The roof 380 may be overlaid with solar panels 382. Therefore, while the turbine generator assembly 312 as explained above is constantly generating electricity via water and current action, the solar panels 382 also may be contributing to power generation and electricity storage in a battery 386, which is in electrical communication with the solar panels 382. Also shown schematically are electrical cables or connections 384 connected between the panels 382 and the battery 386. However, if the assembly 314 is located in proximity to land, the solar-generated electricity can be transmitted directly to a power or electrical grid rather than stored in the battery 386.

With continued reference to FIG. 13, the windmill 316 briefly introduced above includes a power generator 388, which, like the solar panel assembly 314, is electrically connected to the battery 386 (or electrical grid) via electrical lines 384. In this example, the windmill 316 includes three or more exemplary blades 390 that are connected to a shaft 392, which extends from the power generator 388. The windmill 316 and its blades 390 are erected on and supported by a shaft 394 that is connected to a base or brace 396 that may be installed on the hip roof 380 described above. As the turbine generator assembly 312 and the solar panel assembly 314 are respectively generating electricity via water and current action and sunlight, the windmill 316 also may be contributing to power generation and electricity storage in the battery 386 (or feeding the electrical grid) as the wind blows, particularly on the open ocean O.

Figure 14:
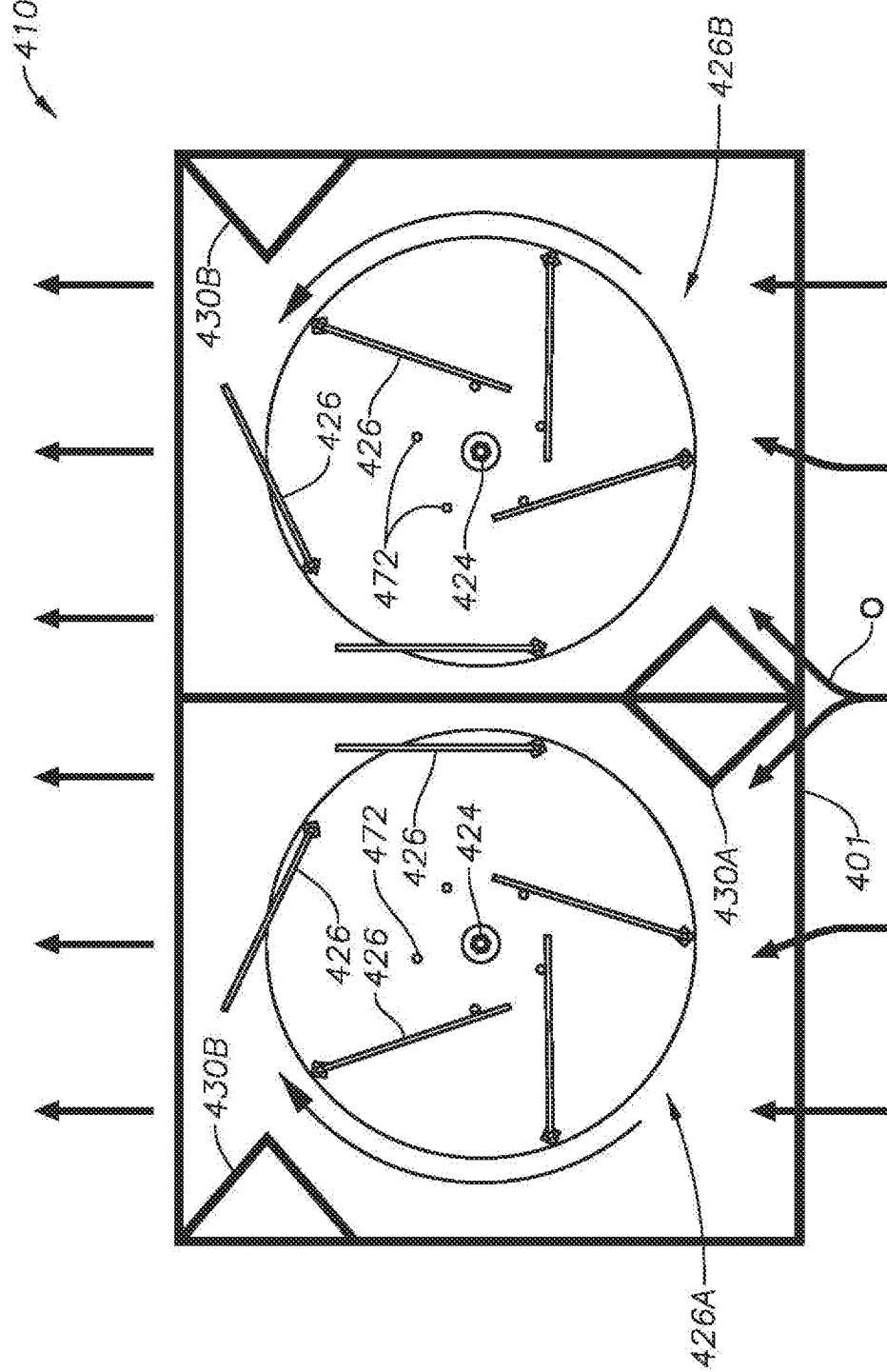
FIG. 14 is schematic plan view of a system according to an aspect of the disclosure, particularly showing two turbines rotating in opposite directions.

FIG. 14 shows a system 410 with two turbines 426A, 426B. Here, the turbines 426A, 426B are rotating in opposite directions (indicated by inwardly directed curved arrows) on their respective central axes 424 thereby countering their respective centrifugal forces, particularly when connected to a floating or tethered structure, schematically indicated here by element number 401. More particularly, a current or sluice separation device 430A operates to "split" or redirect incoming current O to cause turbine 426A to rotate clockwise and to cause turbine 426B to rotate counterclockwise. As each turbine 426A, 426B rotates in its respective direction the individual blades 426 are acted upon by the current O. As shown, the blades 426 closest to the incoming current O and on the outside edges of the flow are pressed against stops 472 to assist with rotation of the turbines 426A, 426B. As the current O flows across the blades 426, the current O encounters baffles or directional walls 430B that serve to concentrate the current O into the turbine blades 426A, 426B to cause more rotational force and further drive the rotation of the turbines 426A, 426B.

Those skilled in the art will appreciate that the disclosure is not limited to the exemplary embodiments described herein. The turbine systems may be smaller or larger than described and shown including greater or smaller lengths, smaller or larger shafts, and blades may be of different sizes, shapes, lengths, or widths and disposed at various angles to accommodate different applications.

The exemplary turbine systems may be used under boat docks, connected to pilings, windmills, buoys, boats, bridges, floating or fixed structures, et cetera in moving water currents. The systems, particularly the blades, can also be formed from various materials such as HDPE, wood, metal, and the like in various thicknesses. Various quantities of blades can be utilized depending on application.

Plunging devices may be used to cushion each blade where it locks into its position, and the blades may be supported in different ways for increased strength, such as the inclusion of ribs to prevent deformation. Further, each blade tip can be angled to various degrees to provide maximum efficiency when slicing through water or other fluids.

The systems may be retrofitted to cargo ships for power generation. The base and top may be supported in various ways to control rotation of blades, and the systems can be used vertically or horizontally or at other angles depending on application. Still further, the top and bottom bases can be connected to gears manually or magnetically and to other systems and devices to generate power or to pump water or other fluids.

EXEMPLARY EMBODIMENTS

Embodiment 1. A reactive turbine system, comprising a turbine having a plurality of reactive turbine blades being configured for communication with a flow of fluid, the turbine further comprising a top base and a bottom base; a system axis; respective individual axes for each reactive turbine blade; and respective slip rings in communication with each of the individual axes for each reactive turbine blade; wherein the top base and the bottom base rotate on the system axis causing each reactive turbine blade to rotate on its respective individual axis until each reactive turbine blade in turn contacts a flow of water on an opposing side of the system, the rotation of the turbine and the reactive turbine blades producing a star pattern over time, the rotation about the system axis and the individual axes via the slip rings generating power.

Embodiment 2. The reactive turbine system of embodiment 1, wherein the flow of fluid is water current, and the turbine blades are configured to rotate as the water current passes along the blades.

Embodiment 3. The reactive turbine system of embodiments 1 or 2, wherein the fluid flow causes each blade to rotate counterclockwise on respective individual axes from a locked position to approximately 120 degrees.

Embodiment 4. The reactive turbine system of any of the embodiments 1-3, wherein as the top and bottom bases continue to rotate counterclockwise or clockwise on the system axis, each blade rotates on its individual axis, respectively counterclockwise or clockwise, moving through the fluid to a path of least resistance wherein the blade remains in a neutral position pivoting on its individual axis.

Embodiment 5. The reactive turbine system of any of the foregoing embodiments, wherein as the top and bottom bases continue to rotate, each blade rotates until it contacts an opposing fluid force, and because of a pivot point and a locking point of a blade angle, the respective blade rotates on its individual axis and returns to a neutral position and to locked position.

Embodiment 6. The reactive turbine system of embodiment 5, wherein the current is forced against respective areas of each blade thereby creating torque to generate power.

Embodiment 7. The reactive turbine system of any of the foregoing embodiments, wherein the turbine blades are arranged proximate a fixed or floating structure.

Embodiment 8. The reactive turbine system of any of the foregoing embodiments, wherein the turbine blades are arranged proximate a water vessel or within a submerged structure.

Embodiment 9. A method for generating power from a continuous fluid flow, the method comprising providing a power generator having a plurality of submersible turbine blades in communication with a flow of fluid in a body of water; arranging a water tower having a water pipe proximate the power generator; providing a submersible pump in communication with the turbine blades, the submersible pump in communication with the water pipe; rotating the turbine blades by the flow of fluid to cause the submersible pump to fill the water tower, the turbine blades further causing the power generator to generate a first source of electricity; providing a hydro turbine generator connected to the water pipe; and arranging a float and piston assembly having a water conduit in communication with the water tower; activating the float and piston assembly by wave action to deliver water to the water tower; providing an electrical receptacle in communication with the power generator and the hydro turbine generator; releasing the water from the water tower when full to activate the hydro turbine generator to generate a second source of electricity; and delivering the first and second sources of electricity being to the electrical receptacle.

Embodiment 10. The method as in embodiment 9, wherein the electrical receptacle is a rechargeable battery or land-based electrical grid.

Embodiment 11. The method as in embodiments 9 or 10, further comprising providing a wind turbine to generate electricity using wind, the wind turbine being in communication with the electrical receptacle to deliver the electricity thereto.

Embodiment 12. The method as in embodiments 9 through 11, wherein the electrical receptacle is a rechargeable battery and further comprising retrieving the rechargeable battery and replacing with a battery to be charged.

Embodiment 13. A continuous fluid flow power generator, comprising a power generator having a plurality of submersible turbine blades in communication with a flow of fluid in a body of water wherein the turbine blades are rotated by the flow of fluid to generate electricity; a floating platform for supporting the power generator; a tower disposed proximate the floating platform, the floating platform connected thereto, the tower having a docking area; and a vessel equipped with a battery bank, the vessel dockable with the docking area, the battery bank being electrically connectable to the power generator to charge the battery bank.

Embodiment 14. The continuous fluid flow power generator as in embodiment 13, wherein the platform is a stationary platform or a floating platform.

Embodiment 15. A reactive turbine system, comprising a turbine having a plurality of blades being configured for communication with a flow of fluid, the turbine further comprising a top base and a bottom base, a system axis, and respective individual axes for each blade, wherein the top and bottom bases rotate on the system axis causing the reactive turbine blade to rotate until the blade contacts a flow of water on an opposing side of the system, each blade swinging approximately 120 degrees from a locked position during each rotation.

Embodiment 16. The reactive turbine system of embodiment 15, wherein the plurality of blades forms a five-star rotation pattern.

Embodiment 17. The reactive turbine system of embodiment 15, wherein the plurality of blades forms at least a five-star rotation pattern.

Embodiment 18. The reactive turbine system of embodiments 15, 16, or 17, wherein a blade width is approximately ⅔ to ½ of a base diameter configured to permit each blade to rotate past a trailing blade.

Embodiment 19. The reactive turbine system of embodiments 15, 16, 17, or 18, further comprising a guard disposed about turbine blades synchronously rotating therewith.

Embodiment 20. A reactive turbine system, comprising a first turbine having a plurality of first reactive turbine blades being configured for communication with a flow of fluid, the first turbine including respective first individual axes for each first reactive turbine blade, and wherein the first turbine rotates counterclockwise causing each first reactive turbine blade to rotate on its respective individual axis until each first reactive turbine blade in turn contacts the flow of water on an opposing side of the first turbine; and a second turbine having a plurality of second reactive turbine blades being configured for communication with the flow of fluid, the second turbine including respective second individual axes for each second reactive turbine blade, and wherein the second turbine rotates clockwise causing each second reactive turbine blade to rotate on its respective individual axis until each second reactive turbine blade in turn contacts the flow of water on an opposing side of the second turbine.

The reactive blades described herein may also be hinged to rotate on their axis pivot points at either end of the reactive blade according to any application in which they are being used. For instance, for use in a wind turbine application, wind and gravity can work together if the blades are oriented horizontally. Those skilled in the art will appreciate that different stopping or cushioning points may be placed at different locations on the top and bottom bases to control overtravel.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

That which is claimed is:

1. A continuous fluid flow power generator, comprising:
   a power generator having a plurality of submersible turbine blades disposed in a frame in communication with a flow of fluid in a body of water wherein the turbine blades are rotated by the flow of fluid to generate electricity, a width of each turbine blade being between ⅔ to ½ of the frame diameter, the turbine blades arranged to rotate clockwise or counterclockwise and to produce a star pattern after a 360 degree rotation;
   a guard disposed about the power generator for protection thereof, the guard being further configured as a reversal blade to maintain alignment of each submersible turbine blade;
   a platform for supporting the power generator;
   a tower disposed proximate the platform, the platform connected thereto, the tower having a docking area; and
   a vessel equipped with a battery bank, the vessel dockable with the docking area, the battery bank being electrically connectable to the power generator to charge the battery bank.

2. The continuous fluid flow power generator as in claim 1, wherein the flow of fluid in the body of water is water current.

3. The continuous fluid flow power generation as in claim 1, wherein the frame comprises a top frame and a bottom frame that rotate about a central axis.

4. The continuous fluid flow power generator as in claim 1, wherein the star pattern produced after the 360 degree rotation is a function of a number of submersible turbine blades.

5. The continuous fluid flow power generator as in claim 4, further comprising:
   an angle between each turbine blade; and
   an opening between each turbine blade, wherein the star pattern is changeable as a function of the angle between each turbine blade and a size of opening between each turbine blade.

6. The continuous fluid flow power generator as in claim 1, wherein the platform is a stationary platform or a floating platform.

7. The continuous fluid flow power generator as in claim 1, wherein the vessel is configured to store electrical energy onboard via the battery bank, discharge electrical energy to a second vessel, or discharge electrical energy to a land-based electrical grid.

* * * * *